United States Patent [19]

Harding

[11] Patent Number: 5,054,738
[45] Date of Patent: Oct. 8, 1991

[54] FISHING ROD AND BEVERAGE HOLDER

[76] Inventor: Harold J. Harding, 1945 Maywood, Independence, Mo. 64052

[21] Appl. No.: 545,555

[22] Filed: Jun. 29, 1990

[51] Int. Cl.⁵ .............................................. A01K 97/10
[52] U.S. Cl. ..................... 248/538; 43/21.2; 248/311.2
[58] Field of Search ............... 248/534, 535, 536, 538, 248/512, 513, 311.2; 43/21.2, 25; 114/364

[56] References Cited

U.S. PATENT DOCUMENTS

| | | | |
|---|---|---|---|
| 358,307 | 2/1887 | Vermilye | 248/538 |
| 420,592 | 2/1890 | Dayton . | |
| 2,137,645 | 11/1938 | Doench . | |
| 2,399,435 | 4/1946 | Gregory | 248/538 |
| 2,423,933 | 7/1947 | Gosh | 248/538 X |
| 2,491,008 | 12/1949 | Lake . | |
| 2,513,475 | 7/1950 | Grevich . | |
| 2,530,265 | 11/1950 | Phalen . | |
| 2,540,584 | 2/1951 | Jaycox . | |
| 2,564,625 | 8/1951 | Jackson et al. . | |
| 3,074,197 | 1/1963 | Schnars . | |
| 3,344,551 | 10/1967 | Chestnut . | |
| 3,653,144 | 4/1972 | Rocko . | |
| 3,669,390 | 6/1972 | Nielson . | |
| 3,917,134 | 11/1975 | Tumlinson . | |
| 4,156,982 | 6/1979 | Phillips, Jr. . | |
| 4,517,761 | 5/1985 | Bleggi . | |
| 4,565,025 | 1/1986 | Behrle . | |
| 4,611,427 | 9/1986 | Coutcher | 43/21.2 |
| 4,645,167 | 2/1987 | Hardwick . | |
| 4,650,146 | 3/1987 | Duke | 43/21.2 X |
| 4,739,575 | 4/1988 | Behrle . | |
| 4,749,162 | 6/1988 | Wanzor . | |
| 4,866,873 | 9/1989 | Valkenburg | 43/21.1 |
| 4,876,980 | 10/1989 | Bell, III . | |
| 4,877,165 | 10/1989 | Behrle . | |

FOREIGN PATENT DOCUMENTS 296368 3/1932 Italy ................................. 248/538

Primary Examiner—J. Franklin Foss
Attorney, Agent, or Firm—Hovey, Williams, Timmons & Collins

[57] ABSTRACT

A utility device (10) for use by fishermen in and around fishing docks and boats is provided which is designed to securely hold one or more fishing rods (27) along with a beverage container (30). The device (10) is of compact, integral metallic construction and includes a pair of fishing rod-receiving bodies (12) each equipped with a beverage container-engaging segment (28) rigidly secured thereto. The bodies (12) are in turn supported for releasable connection to a rail (44) or the like by means of an elongated channel (32) of inverted, U-shaped configuration.

3 Claims, 4 Drawing Sheets

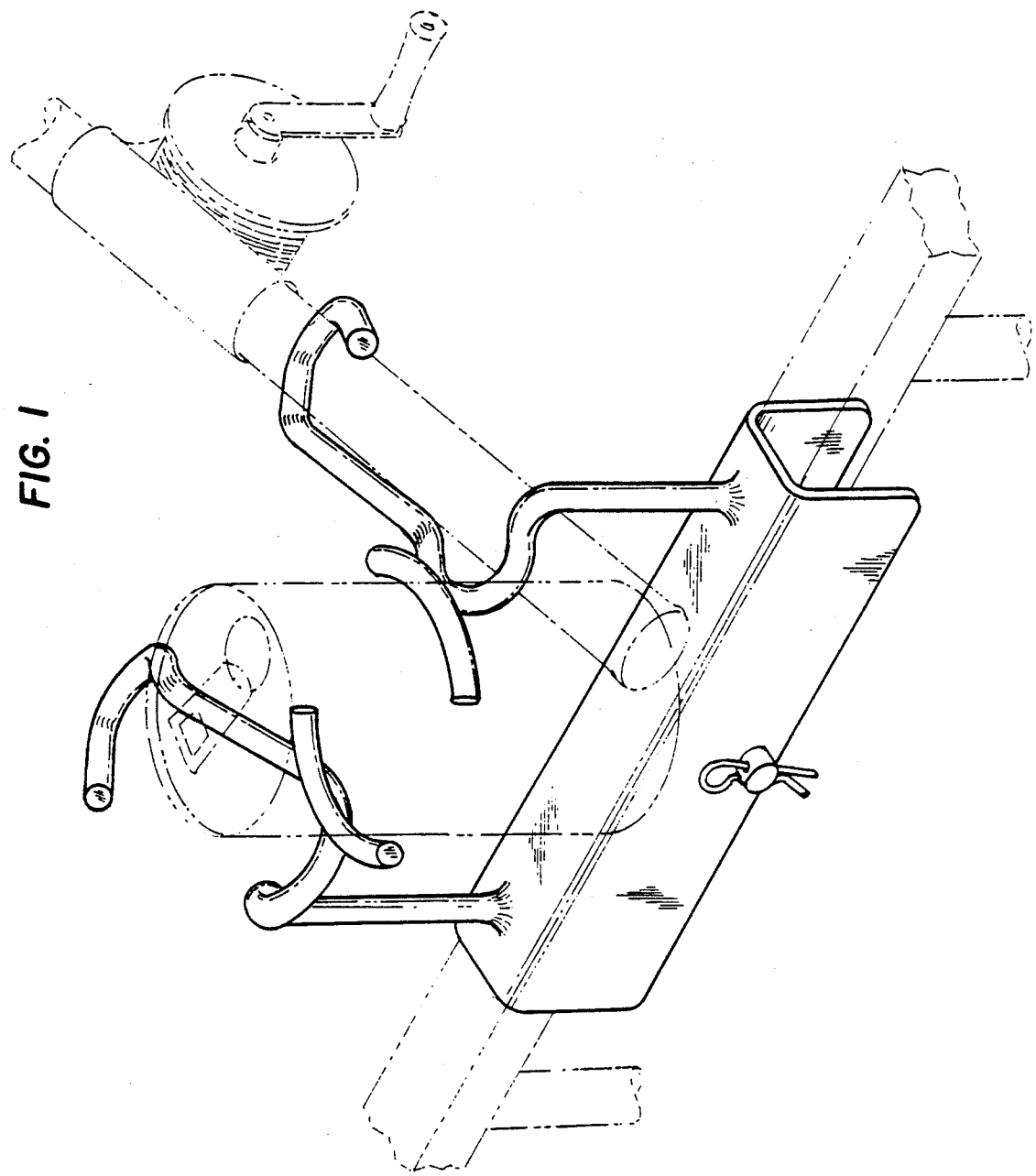
FIG. I

FISHING ROD AND BEVERAGE HOLDER

BACKGROUND OF THE INVENTION

1. Field of the Invention

The present invention is broadly concerned with a compact, integrally constructed utility device for fishermen which can be used to hold a pair of fishing rods in an inclined orientation, together with a beverage container such as an aluminum can. More particularly, it is concerned with such a utility device which is advantageously formed of aluminum and presents a pair of upright, laterally spaced apart rod holders; an arcuate container-engaging segment is secured to each rod holder to cooperatively define a container support.

2. Description of the Prior Art

Fisherman have long made use of a variety of devices for holding their fishing rods in an inclined orientation while awaiting the response of fish. These devices have ranged from simple forked sticks to specially configured designs adapted to be secured to a boat for example.

The past time of fishing is often accompanied by a desire for refreshment, and as a consequence many fishermen imbibe from cans or cups of liquids such as beer or soft drinks. In many instances there is no convenient place to hold such beverage containers in and around the fishing site.

U.S. Pat. No. 4,645,167 describes a boat seat arrangement having a complicated accessory assembly. The latter includes an upright tray presenting a central beverage container holder, together with a pivotal arm supporting a fishing rod holder. While devices of this character may be suitable for large boats, they find little utility in and around docks or small fishing boats not equipped with deck chairs. U.S. Pat. No. 3,917,134 describes an equipment carrier designed to be worn about the waste of a fisherman. This belt-like device includes a rod holder and an accessory beverage container holder. However, devices of this character are inherently unstable and significantly inhibit the movement of the fisherman.

SUMMARY OF THE INVENTION

The present invention overcomes the problems outlined above and provides an improved utility device for fishermen of compact, lightweight design for properly supporting one or two fishing rods, as well as a beverage container.

Broadly speaking, the utility device of the invention comprises an upright body including structure defining an inclined passageway therein for receiving and holding the handle end of a fishing rod, together with support structure for holding a beverage container, the latter including an arcuate container-engaging member rigidly secured to the rod-receiving body. Means are also provided for releasably securing the body and container support structure to a rail or the like, whereby the device may be readily used in and around docks or small boats.

In preferred forms, the utility device includes a pair of laterally spaced apart rod-receiving bodies, each integrally formed as a rod-like member presenting a pair of spaced, aligned, arcuate rod-engaging sections cooperatively defining a rod-receiving passageway. Each of the rod-like bodies is further equipped with an arcuate segment which together form a support for a beverage container. An elongated U-shaped in cross section channel supports the bodies and permits ready but releasable connection of the entire device to a rail or the like. Furthermore, the channel presents a central bight which engages and supports the bottom of a beverage container.

BRIEF DESCRIPTION OF THE DRAWINGS

FIG. 1 is a perspective view of the utility device of the invention, shown in use mounted on a rail and holding the handle end of a fishing rod and a beverage container, all of the latter being depicted in phantom;

DESCRIPTION OF THE PREFERRED EMBODIMENT

Figure 3:
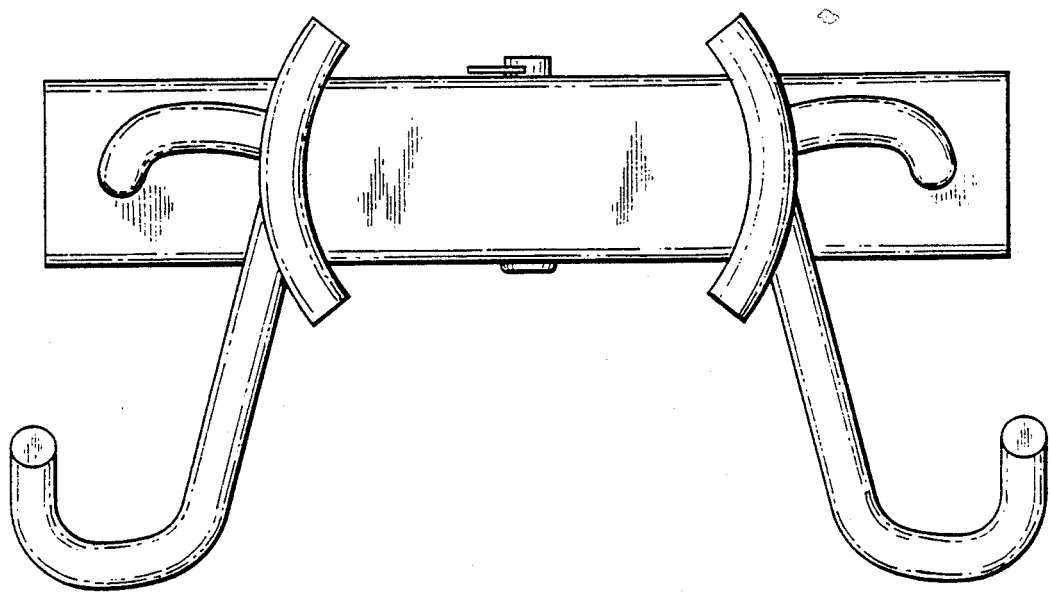
FIG. 3 is a plan view thereof.
Figure 2:
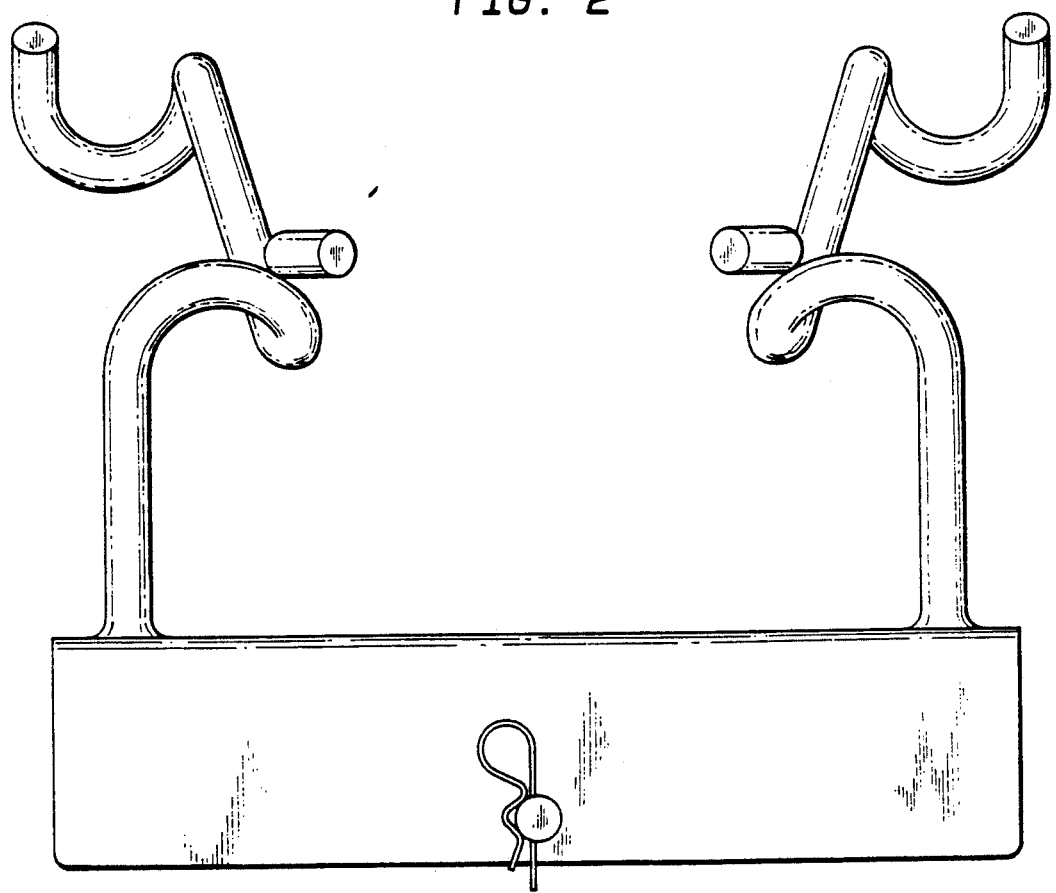
FIG. 2 is a front elevational view of the device illustrated in FIG. 1.
Figure 4:
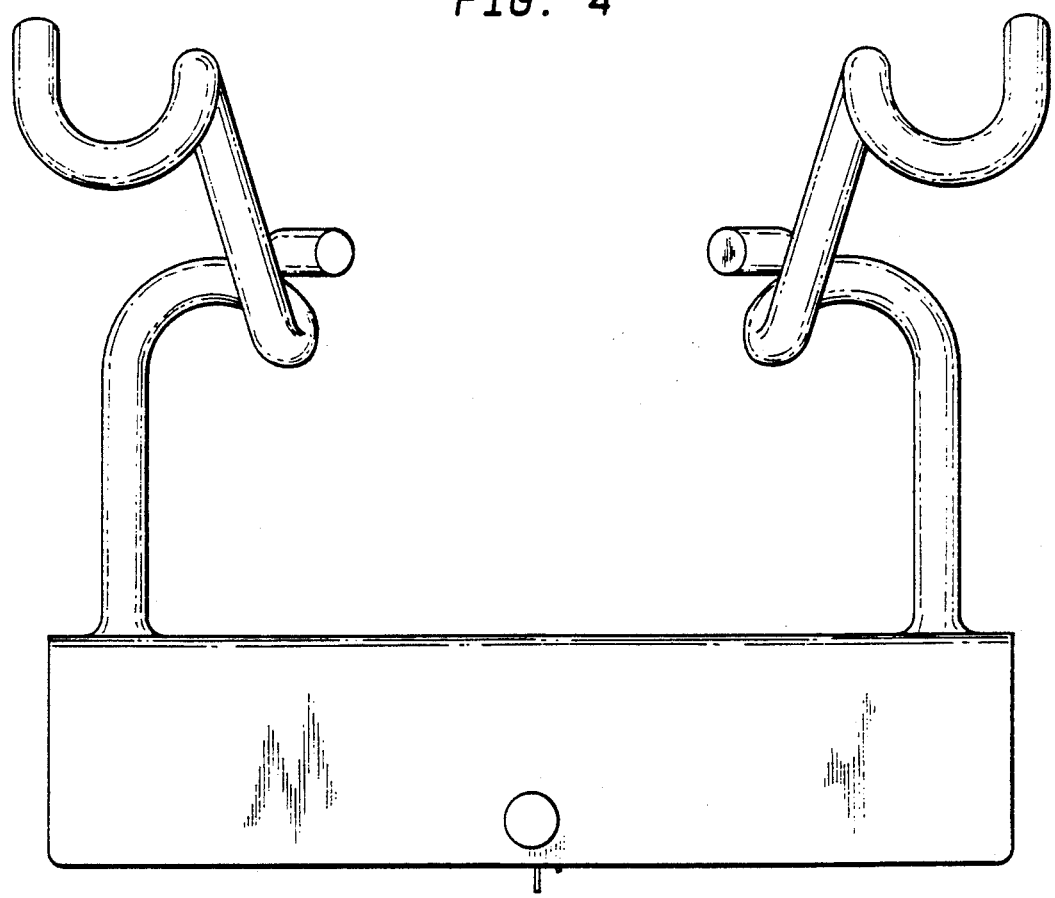
FIG. 4 is a rear elevational view thereof.
Figure 5:
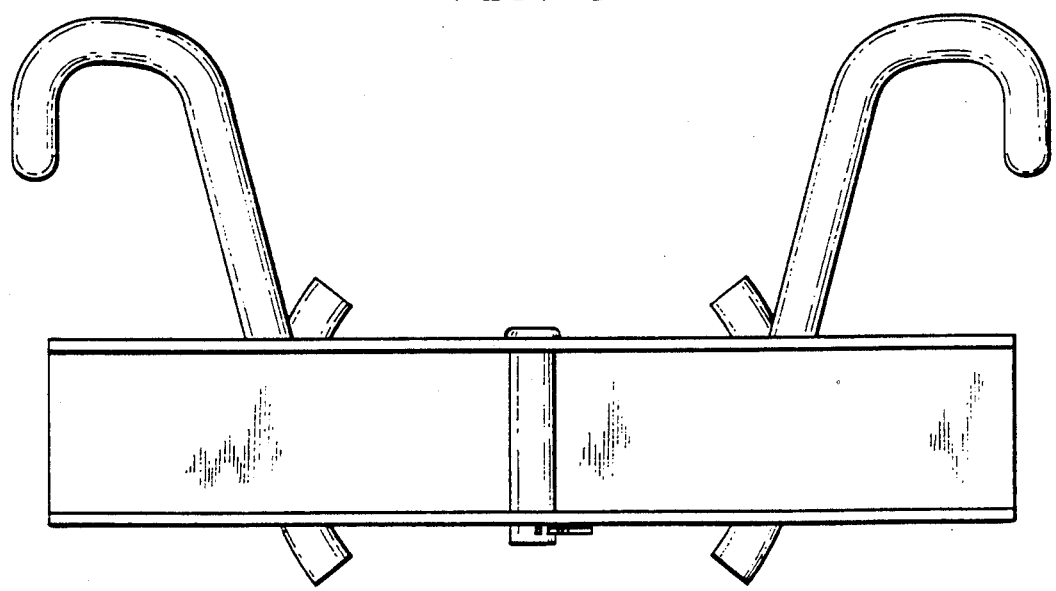
FIG. 5 is a bottom view thereof.
Figure 6:
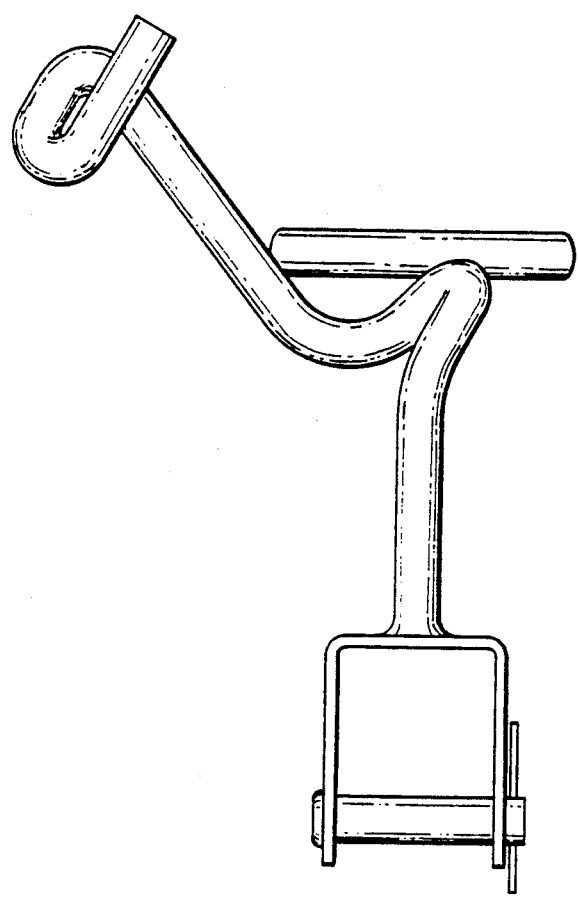
FIG. 6 is a side elevational view thereof.

Turning now to the drawings, a utility device 10 for use by fishermen broadly includes a pair of identical, mirror-image fishing rod receiving bodies 12, a corresponding pair of beverage container-engaging supports 14 respectively secured to a corresponding body 12, and means 16 for releasably securing the bodies 12 and supports 14 to a rail or the like.

In more detail, each body 12 is in the form of an integral metallic rod-like member presenting a vertically disposed bottom leg 18, a pair of spaced apart, arcuate rod-engaging sections 20, 22, and an inclined connector leg 24 extending between and interconnecting the sections 20, 22. It will be observed in this respect that the section 20 is of downwardly opening, somewhat U-shaped configuration, whereas the upper section 22 is of upwardly opening, U-shaped configuration. Moreover, the sections 20, 22 are in alignment so as to cooperatively define an inclined passageway configured to receive and hold the handle end 26 of a conventional fishing rod 27 (see FIG. 1).

Each body 12 is further equipped with a horizontally opposed arcuate in plan configuration beverage container-engaging segment 28. Specifically, each segment 28 is rigidly and permanently secured to a corresponding body 12 adjacent the apex of the section 20. Again referring to Claim 1, it will be seen that the opposed segments 28 are strategically located for holding therebetween a beverage container such as aluminum can 30.

The securement means 16 is preferably in the form of an elongated channel 32 of inverted, generally U-shaped configuration, presenting a central uppermost bight 34 as well as depending, apertured front and rear legs 36, 38. As is evident from the drawings, the bodies 12 are secured to channel 32 by welding of the bottom legs 18 thereof to bight 34. The upper surface 34A of bight 34 is preferably flattened and is directly beneath the opposed segments 28; thus, this face 34A supports the bottom of can 30. The securement means 16 further includes a locking pin 40 designed to pass through the aligned leg apertures, with the pin being releasably secured in place by means of cotter pin 42. As illustrated in FIG. 1, the securement means 16 permits placement of device 10 onto a conventional rail 44, as may be found in and around fishing docks.

During use of the device 10, it is first releasably locked in place onto a rail 44 or similar expedient, using for this purpose pin 40 and cotter pin 42 in the convention fashion. The user may then insert one or two fishing rods into the spaced bodies 12, while also placing a beverage container, such as can 30, into the region between the bodies 12. Such beverage container is maintained in place by means of the segments 28, as well as the surface 34A of bight 34.

I claim:

1. A utility device for fishermen, comprising:

an upright body including structure defining and inclined passageway therein for receiving and holding the handle end of a fishing rod;

support structure for holding a beverage container including arcuate container-engaging member rigidly secured to said body; and means for releasably securing said body and support structure to a rail or the like, there being a pair of said bodies laterally spaced from one another, each body including structure defining an inclined passageway therein for receiving and holding the handle end of a respective fishing rod, said container-holding support structure comprising a pair of opposed, arcuate segments respectively secured to a corresponding body, said securing means including a downwardly opening, generally U-shaped in cross section channel supporting said bodies and presenting a bight section and a pair of depending legs, the upper surface of said bight section defining a surface for supporting of a bottom of a beverage container.

2. The device of claim 1, said container-holding support structure comprising an arcuate, rod-like segment secured to said body.

3. The device of claim 1, each of said bodies comprising an integral, rod-like element including an upright section and a pair of spaced, aligned, arcuate sections cooperatively presenting said passageway.

* * * * *